United States Patent

Williams

[11] Patent Number: 5,928,985
[45] Date of Patent: Jul. 27, 1999

[54] COPPER CATALYSTS

[75] Inventor: Brian Peter Williams, Darlington, United Kingdom

[73] Assignee: Imperial Chemical Industries PLC, United Kingdom

[21] Appl. No.: 08/702,581

[22] PCT Filed: Feb. 28, 1995

[86] PCT No.: PCT/GB95/00416

§ 371 Date: Sep. 3, 1996

§ 102(e) Date: Sep. 3, 1996

[87] PCT Pub. No.: WO95/23644

PCT Pub. Date: Sep. 8, 1995

[30] Foreign Application Priority Data

Mar. 4, 1994 [GB] United Kingdom ............... 9404198

[51] Int. Cl.⁶ .................................................. B01J 23/72
[52] U.S. Cl. ........................... 502/345; 502/342; 502/38
[58] Field of Search ........................... 502/342, 345, 502/34, 38

[56] References Cited

U.S. PATENT DOCUMENTS 4,062,899  12/1977  Laurer et al. ........................ 568/855
4,863,894   9/1989  Chinchen et al. ..................... 502/342

Primary Examiner—Michael L. Lewis
Assistant Examiner—Alexander G. Ghyka

[57] ABSTRACT

Stabilization of a reduced copper catalyst by a) passivating the catalyst by passing a gas stream that is free of reducing gases and which contains 0.05 to 0.5% by volume of oxygen and an amount of carbon dioxide at least twice the amount of oxygen through a bed of the catalyst until the catalyst is passivated, the proportion of oxygen in said gas stream and the temperature at which it is fed to the bed being such that the temperature of the catalyst does not rise to above 100° C. during said passivation step, and then b) increasing the oxygen content of the gas passing through the bed until the oxygen partial pressure corresponds to that of air at atmospheric pressure. The process may be applied to the stabilization of fresh reduced catalysts or to the stabilization of used, e.g. spent catalysts, before discharge thereof from a reactor.

9 Claims, 1 Drawing Sheet

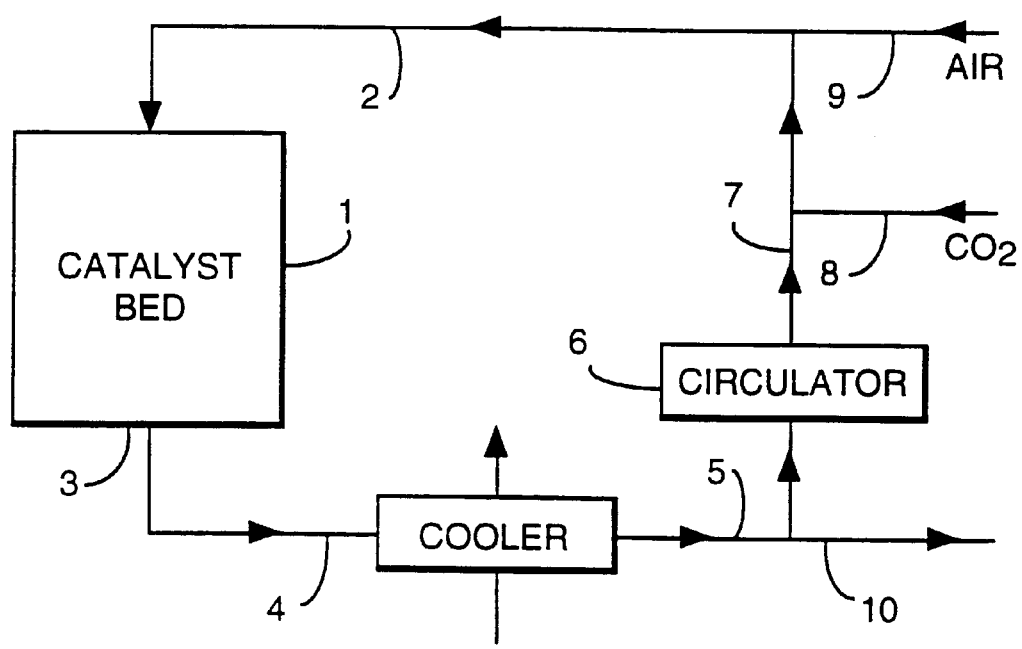

COPPER CATALYSTS

This invention relates to copper catalysts. Copper catalysts are widely employed in reactions involving hydrogen. Thus they are employed for hydrogenations, including the hydrogenation of carbon oxides to organic oxygen-containing compounds, such as alcohols, e.g. methanol, and for the shift reaction where carbon monoxide is reacted with steam to form carbon dioxide and hydrogen. They may also be used for the reverse of the shift reaction.

Such copper catalysts usually have the copper in finely dispersed form, and usually incorporate a support or stabiliser such as silica, alumina, chromia, magnesia, and/or zinc oxide to maintain the copper in that finely dispersed form. The catalysts are often supplied as oxidic precursors which require reduction, e.g. with hydrogen, to the active state. This reduction step is often relatively lengthy and consumes a considerable amount of reducing gas, e.g. hydrogen, which in some cases has to be imported to effect the reduction. It is not normally possible to supply copper catalysts in the reduced state as such reduced catalysts tend to be pyrophoric and so present handling difficulties.

After a period of use the catalyst will tend to lose its activity: eventually the activity will have been lost to such an extent that it is necessary to discharge the catalyst and to fill the catalytic reactor with a fresh charge of catalyst. Again, as a result of the pyrophoric nature of the reduced catalysts, special measures have to be taken to effect the discharge of the catalysts. Generally it is necessary to oxidise the copper, under carefully controlled conditions, before discharge is effected. This oxidation step is generally quite time consuming. An alternative discharge method involves displacing an inert atmosphere, e.g. of nitrogen, in the catalyst bed with water: the catalyst can then be discharged together with the water and allowed to weather. However this presents environmental problems as the water tends to be contaminated with copper dust and so disposal of the water after separation from the discharged catalyst presents problems.

The problems of both the lengthy reduction of fresh oxidic copper catalyst precursors and the discharge of spent copper catalysts can be overcome by effecting passivation of the reduced copper. Thus the copper surface is oxidised to a state at which the catalyst can be safely handled. Thus catalysts which have been reduced to the active state and then passivated by the catalyst manufacturer can be supplied without incurring handling problems to the customer who need only effect re-reduction of the oxidised surface layers. Thus the amount of reduction that need be effected by the customer is decreased. Likewise passivation of reduced copper catalysts to a readily handleable state can assist discharge of the catalysts from reactors.

Stabilisation of copper catalysts by passivation is described in GB-A-1319622. In this reference it is proposed that the reduced catalyst is contacted with an inert gas, e.g. nitrogen, and then a small concentration of oxygen, e.g. air, is introduced at such a rate as to keep the temperature below 150° F. (66° C.). The oxygen concentration is gradually increased until the oxygen content is at least 5% by volume: in the example, it is indicated that, despite the passivation treatment, 93% of the copper was still in the elemental state.

We have devised an improved stabilisation method involving passivation. In the present invention the passivation is effected with carbon dioxide as well as oxygen, e.g. air. We have found that the use of carbon dioxide as well as oxygen confers significant benefits.

The aforesaid GB-A-1319622 discloses that an oxidic copper catalyst precursor can be reduced by passing a stream of inert gas over the catalyst to heat the precursor to 350–375° F. (177–191° C.) and then introducing hydrogen to effect the reduction. Upon completion of the reduction, passivation can be effected by purging the hydrogen with inert gas, cooling to 100° F. (38° C.) and then introducing the small concentration of oxygen as aforesaid. Although carbon dioxide is listed as a possible inert gas for the reduction step, the only inert gas mentioned in the context of the passivation stage is nitrogen: there is no appreciation that the presence of carbon dioxide in the passivation step is advantageous.

We have found that stabilisation involving passivation with carbon dioxide and oxygen can be effected faster than when using oxygen (or air) alone and results in a stable passivated catalyst wherein, for catalysts of similar copper crystallite size, a greater proportion of the copper is still in the elemental form and yet the passivated catalyst can still be handled safely. As a result, where the technique is applied to stabilise a freshly reduced catalyst for supply to a customer, less re-reduction has to be effected, thus giving significant savings to the customer. Applied to reduced, used catalysts before discharge, the process of the present invention enables the stabilisation prior to discharge to be effected more rapidly, again giving significant savings.

Accordingly the present invention provides a process for the stabilisation of a reduced copper catalyst comprising a) passivating the catalyst by passing a passivating gas stream that is free of reducing gases and which contains 0.05 to 0.5% by volume of oxygen and an amount of carbon dioxide at least twice the amount of oxygen through a bed of the catalyst until the catalyst is passivated, the proportion of oxygen in said passivating gas stream and the temperature at which said passivating gas stream is fed to the bed being such that the temperature of the catalyst does not rise to above 100° C. during said passivation step, and then b) increasing the oxygen content of the gas passing through the bed until the oxygen partial pressure corresponds to that of air at atmospheric pressure.

If, after effecting passivation, the catalyst temperature is above 50° C., the catalyst is preferably cooled to below 50° C. before increasing the oxygen partial pressure to that of air at atmospheric pressure.

The reduced catalyst to which the passivation process of the invention may be obtained by reduction of a precursor in which the copper is present as a reducible compound, such as copper oxide, copper hydroxide, copper carbonate, and basic copper carbonates. Such precursors may be obtained by dry mixing the copper compound, usually in finely divided form, with any other desired ingredients of the precursor such as zinc, chromium, zirconium, magnesium, silicon and/or aluminium compounds or by a precipitation route where the copper compound is obtained by precipitation from a copper salt solution with a suitable basic compound, such as sodium carbonate and/or hydroxide. Other ingredients as aforesaid may be co-precipitated with the copper compound or sequentially precipitated, before or after the copper compound, or added to a slurry of the precipitated copper compound. Generally after forming such a composition containing the copper compound and other ingredients, the precursor is calcined to convert the copper compound, and any readily decomposible compounds of other ingredients to the corresponding oxides. The composition is often formed into pellets or granules before or after any calcination step. In some cases it may be desirable to form the composition into such granules or pellets after reduction of the copper compound. Alternatively the precursor may be made by impregnating a support, such as alumina, zirconia, magnesia, and/or silica with a solution of a copper compound, such as copper nitrate, and optionally compounds of other metals, followed by heating to decompose the copper compound to the oxide. The reduced catalyst preferably contains 5–95%, particularly 10–80%. by weight of copper.

Upon passing the oxygen-containing gas through the catalyst bed and increase in temperature of the catalyst typically increases by about 10–15° C. for each 0.1% by volume of oxygen in the gas stream. This temperature rise is termed an exotherm. The magnitude of this temperature rise is not, in general terms, related to the amount of reduced copper or indeed to a great extent on the catalyst at all. In general the magnitude of the temperature rise is more dependent on the heat capacity of the gas. The heat is generated by reaction of the oxygen with the copper: initially the solid catalyst is heated but the solid soon reaches a maximum temperature and the heat generated is carried away in the gas. The "exotherm" moves through the bed until all the catalyst returns to the temperature of the inlet gas. This is true provided that the reaction front moves through the bed more slowly than the heat front. In a typical example of the process of the invention, at a gas space velocity of 1500 $h^{-1}$ the heat front takes 45–60 minutes to move through the bed but the reaction front may take much longer, e.g. 9 hours. Where there is so little reaction to carry out that the reaction front moves through the bed at a similar or faster speed than the heat front a rapid exotherm will develop which will quickly be exhausted and move out of the reactor. The increase in temperature can be observed by thermocouples placed in the catalyst bed, and may be seen to move through the bed from the gas inlet end thereof towards the outlet. Depending on the previous history of the catalyst an exotherm may also be observed when the carbon dioxide is contacted with the catalyst. Thus in the case of a freshly reduced catalyst that has not been used for a reaction involving or producing carbon dioxide, an exotherm, typically of up to about 50° C., may pass rapidly through the bed upon contacting the catalyst with carbon dioxide. This latter exotherm is generally not observed when a catalyst that has been used for a reaction involving, or producing, carbon dioxide, e.g. methanol synthesis or the shift, or reverse shift, reaction, is contacted with a carbon dioxide gas during the passivation process. Where a catalyst that has not previously been contacted with carbon dioxide, e.g. in the preparation of a freshly reduced and passivated catalyst, is simultaneously contacted with carbon dioxide and oxygen, a double or combined exotherm may be observed. Thus an initial exotherm corresponding to reaction with carbon dioxide may pass rapidly through the bed and an exotherm, hereinafter termed the oxidation exotherm, corresponding to the aforesaid 10–15° C. per 0.1% oxygen in the gas stream may be observed passing more slowly through the bed. Passivation is complete when the exotherm corresponding to the reaction with oxygen has passed right through the bed, i.e. when the temperature at the outlet end of the bed has reached its peak and started to fall as a result of the cooling effect of the continued supply of gas. In contrast to previous passivation techniques, it is not necessary to gradually increase the oxygen content to effect passivation. Thus, once the oxidation exotherm has passed through the bed, the partial pressure of oxygen in the gas can be increased up to a level corresponding to that of air at atmospheric pressure. It will be appreciated that if the passivation is effected at elevated pressure, it is possible to effect this simply by introducing air and reducing the pressure to atmospheric pressure.

During the passivation reaction, i.e. during contact with a gas containing oxygen, the maximum temperature of the catalyst may be as high as 100° C., but is preferably less than 90° C., and in particular less than 60° C. The maximum catalyst temperature employed will to some extent be determined on the application envisaged. Thus whereas relatively high temperatures, e.g. 80–90° C., may be acceptable where a used catalyst is being passivated prior to discharge and disposal, lower maximum temperatures, e.g. less than 60° C., are desirable where the passivation is being effected on freshly reduced catalyst prior to supply to a customer. It is however permissible to allow the catalyst to be subject to temperatures above the aforesaid maximum before contact with the oxygen-containing gas. Thus, if a freshly reduced gas is contacted with carbon dioxide, in the absence of oxygen, an exotherm of up to about 50° C. may be observed as mentioned above: it is not necessary that the temperature of the catalyst during the passage of this exotherm through the bed is kept below the aforesaid maximum.

One advantage of the application of the passivation process of the invention to fresh catalyst for supply to a customer is the ease with which the reduced, but passivated, catalyst can be re-reduced and converted to the active state. Reduction can be effected at much lower temperatures than are required for the reduction of oxidic catalyst precursors, and indeed in some processes a step of re-reduction may not be necessary: thus, where the catalyst is to be used in a reaction wherein the reactants fed to the catalyst contain a reducing gas such as hydrogen or carbon monoxide, the passivated catalyst may be charged to the plant reactor, which is then purged of air with an inert gas. Upon switching to the desired reactants and heating to the desired reaction temperature, or vice versa, the necessary re-reduction will occur.

A further advantage results from the use of pre-reduced and passivated catalysts. Thus a considerable volume reduction generally occurs upon reduction of oxidic precursors. By pre-reducing and passivating the catalyst, it is possible to charge a greater amount of active copper catalyst to a reactor of a given size than if, as is normally the procedure, an oxidic catalyst precursor is charged to the reactor in which it is to be used and reduced in situ. In the latter case, shrinkage of the precursor upon reduction gives rise to an increase in the space at the top of the reactor so that the reactor volume is not fully utilised. The use of a greater amount of active copper enables the throughput of a given reactor to be increased.

The oxygen concentration that is employed for the passivation is in the range 0.05 to 0.5% by volume. As indicated above, the magnitude of the oxidation exotherm is typically 10–15° C. for each 0.1% by volume of oxygen in the gas. Hence, in order to keep the maximum catalyst temperature to an acceptable value, the maximum oxygen concentration that may be employed will largely depend upon how low an inlet temperature can be used. It will be appreciated that for a given maximum temperature, an increase in the inlet temperature will result in the need to decrease the oxygen concentration to avoid exceeding that given maximum temperature with the result that the passivation step will take longer. Thus if the inlet temperature is 25° C., to avoid a maximum temperature above about 60° C. the oxygen concentration should be below about 0.25% by volume. On the other hand, if the inlet gas temperature is 15° C. and a maximum temperature of 90° C. can be tolerated, an oxygen concentration as high as 0.5% by volume may be employed. If the inlet temperature is too low, the initial rate of reaction may be low and so it is preferred that the inlet temperature is at least 10° C.

It is believed that the passivation is effected as a result of the formation of a very thin copper carbonate, possibly cuprous carbonate, layer on the copper surface of the catalyst: calculations based upon the amount of oxygen employed and the copper surface area of the catalyst in a typical passivation, show that it is probable that only the first few, e.g. 2, layers of copper atoms at the catalyst surface react to form the copper carbonate. As a result the bulk of the copper remains in the reduced state. It further appears that, at least at temperatures up to about 50° C. on exposure to air no further, or bulk, oxidation of the copper takes place. In contrast, with copper catalysts passivated with oxygen in the absence of carbon dioxide, the outer layers of the copper surface are converted to copper oxide. While this oxide layer may be thick enough to render the passivated catalyst safe to handle and non-pyrophoric, it appears that diffusion of oxygen from the air gradually occurs through this layer gradually oxidising the bulk of the copper. Thus examination of a typical copper/zinc oxide/alumina low temperature shift catalyst that had been passivated with oxygen in the absence of carbon dioxide showed a gradual decline in the proportion of reduced copper remaining on exposure to the atmosphere at room temperature: after 1. day the proportion of reduced copper had dropped to about 62%, and after 12 days the proportion had dropped to about 54%. Furthermore if a copper catalyst that has been passivated in the absence of carbon dioxide is heated in air, rapid oxidation occurs at temperatures above about 60° C., whereas with copper catalysts passivated in the presence of carbon dioxide essentially no oxidation is observed on heating in air until the temperature is significantly above 100° C.

Accordingly the present invention also provides a passivated copper catalyst having a thin copper carbonate layer on the copper surface and which does not exhibit substantial oxidation when heated in air from 20° C. at a rate of 10° C. per minute until the temperature has reached at least 100° C.

The presence of the copper carbonate layer is generally not detectable by techniques such as X-ray diffraction spectroscopy but can be observed by X-ray photoelectron spectroscopy (XPS) or by infra-red spectroscopy.

In order to form a copper carbonate, rather than copper oxide, layer two molecules of carbon dioxide are needed for each oxygen molecule. Therefore the gas used for passivation should contain at least twice as much carbon dioxide as oxygen. Thus air, which contains only about 0.03% by volume of carbon dioxide, gives rise to copper oxide surface layers rather than a copper carbonate layer. It is thought that the proportion of carbon dioxide should be such that the formation of the copper carbonate surface layer is favoured rather than diffusion of oxygen adsorbed on the copper surface into the bulk of the copper with consequent bulk oxidation of the latter. Therefore it is preferred that the proportion of carbon dioxide in the passivating gas is much greater than the oxygen concentration and preferably is at least 5% by volume, particularly at least 10% by volume. Most preferably the passivating gas has a carbon dioxide partial pressure of approximately 0.3 bar abs, or more.

It will be appreciated from the foregoing that the passivation may be effected using a passivating gas consisting essentially of carbon dioxide and a small proportion of oxygen air, or of an inert gas admixed with carbon dioxide and a small proportion of oxygen or air. Suitable inert gases include nitrogen, helium, and argon. While hydrocarbon gases such as methane are here inert, their use is less preferable from safety considerations.

As indicated above, when a reduced catalyst that has not used for reactions involving, or producing, carbon dioxide is first contacted with carbon dioxide, a sharp exotherm may be produced. While it is possible to effect passivation in such cases by contacting the catalyst with a mixture of carbon dioxide and the requisite proportion of oxygen (and, if desired also an inert gas), the substantial exotherm resulting from the contact of the catalyst with carbon dioxide may result in the catalyst being exposed to an unacceptably high temperature in the presence of oxygen. As a result, it may be necessary to employ an inconveniently low inlet temperature so that the desired maximum temperature is not exceeded. To avoid this problem, it is therefore preferred in those cases where the reduced catalyst has not been used in reactions involving or producing carbon dioxide, to contact the catalyst first with carbon dioxide in the absence of oxygen and allow the exotherm resulting from that contact to pass through the catalyst bed. Then the requisite amount of oxygen is introduced to effect the passivation step.

The passivation may be effected at atmospheric pressure (in which case it is preferred to use a mixture consisting essentially of carbon dioxide and the small amount of oxygen or air as the passivating gas) or at elevated pressure. The upper pressure limit is determined by the proportion of carbon dioxide present: thus liquefaction of the carbon dioxide should be avoided. Typically the pressure employed will be in the range 1–20 bar abs.

A particularly suitable passivation technique is further described with reference to the accompanying drawing which is a diagrammatic flow sheet.

Referring to the drawing, the catalyst to be passivated is situated as a bed 1 in a vessel provided with ports for the flow of passivating gas from line 2, through the bed, and out via line 3. A cooler 4 is provided to cool the gas in line 3 giving a cooled gas which is fed, via line 5, to the inlet of a circulator 6. The gas leaves circulator 6 via line 7. Provision is made to supply carbon dioxide via line 8 and air via line 9 to the gas leaving the circulator 6. The gas from line 7, together with any carbon dioxide and air added via lines 8 and 9 forms the gas fed to the catalyst bed via line 2. A vent or purge line 10 is provided to enable the pressure in the system to be controlled.

In a typical passivation procedure, initially an inert gas, e.g. nitrogen, is circulated round the loop formed by the catalyst bed, cooler and circulator and so maintains the catalyst under an inert atmosphere. Cooler 4 ensures that the temperature of the circulating gas entering the circulator is kept at a suitable low temperature, e.g. 15–25° C. The temperature of the gas leaving the circulator 4 will depend on the amount of compression that has to be performed by the circulator to maintain the flow at the desired rate. If the temperature rise across the circulator is large it may be desirable to provide for a cooler in the circulator delivery line, e.g. in line 7 or in line 2 as well as, or instead of, the cooler in line 3. Preferably the temperature at which the gas is fed to the catalyst bed via line 2 is less than 40° C. Typically the pressure in the loop at this stage is about 5 bar abs. Carbon dioxide under pressure is then introduced into the loop via line 8 until the pressure in the loop has risen to about 7 bar abs: the circulating gas is thus about 70% by volume inert gas and 30% by volume carbon dioxide. If the catalyst is one that is freshly reduced, i.e. has not been used for reactions involving or producing carbon dioxide, an exotherm will generally be observed to pass rapidly through the bed. Once any such exotherm has passed through the bed and the bed temperature returned to its original value, oxygen, or air, is then introduced via line 9 at a controlled rate so that the gas flowing through line 2 has an oxygen content typically in the range 0.1 to 0.3% by volume. Gas is vented as necessary through purge line 10 to maintain the pressure approximately constant. The gas entering the catalyst bed 1 from line 2 effects passivation of the catalyst in the inlet region of the bed, consuming the oxygen (and a little of the carbon dioxide): the region where passivation is occurring moves through the bed as the inlet region becomes fully passivated. The passivation reaction is exothermic and so causes the temperature of the catalyst to rise locally. However the passivated catalyst is then cooled by the incoming cool gas. By means of thermocouples disposed in the bed it is possible to follow the course of the passivation by observing the progression of the oxidation exotherm through the bed. While passivation is occurring, the gas leaving bed 1 via line 3 will contain essentially no oxygen. When passivation is complete, not only will the oxidation exotherm have reached the end of the bed and the temperature of the outlet region of the bed started to fall from the peak temperature achieved, but also, by the use of suitable monitoring equipment, oxygen can be detected in the gas leaving the bed via line 3. The supply of oxygen or air via line 9 can then be increased until the oxygen partial pressure of the gas in the loop reaches about 0.2 bar abs. i.e. essentially that of air at atmospheric pressure. This increase in the supply of air may be accompanied by purging gas from the loop, via line 10, with or without decrease of the loop pressure.

The sharpness of the oxidation exotherm, i.e. local heating in the catalyst bed, will depend on the oxygen concentration of the gas used for the passivation and also on the flow rate. Preferably the flow rate is such that the space velocity of the gas (expressed at STP) flowing through the bed is in the range 300–2500, particularly 800–1600, $h^{-1}$.

The invention is illustrated by the following examples.

EXAMPLE 1

A pelleted copper oxide/zinc oxide/alumina methanol synthesis catalyst precursor, containing about 60% by weight of copper oxide, was charged to a reactor. Air was purged from the catalyst by a flow of nitrogen at atmospheric pressure and then, while continuing the flow of nitrogen, the temperature was increased to 210° C. The flow of nitrogen was replaced by a flow of helium containing 2% by volume of hydrogen which was passed over the precursor at a space velocity of 850 $h^{-1}$. Reduction of the copper oxide in the precursor took place, giving a maximum temperature rise of 20° C. After 17 hours, the hydrogen/helium mixture was replaced by nitrogen and purged for 2 hours to remove any residual hydrogen. The reduced catalyst was then cooled, under the flow of nitrogen, to about 20° C.

The flow of nitrogen was then replaced by a flow of carbon dioxide containing 0.1% oxygen at a space velocity of 1000 $h^{-1}$. An exotherm of about 50° C. was observed to pass rapidly through the bed of catalyst. The bulk of this temperature rise was due to reaction with carbon dioxide. After passage of the 50° C. exotherm through the bed, the temperature fell to a temperature about 10° C. above the inlet temperature and this 10° C. exotherm passed more slowly through the bed indicating passivation of the reduced catalyst was taking place. When the temperature of the whole catalyst bed had fallen to ambient, the oxygen concentration of the gas was increased to 21% by volume, and then the passivated catalyst was discharged. No warming of the catalyst was observed upon discharge.

X-ray diffraction spectroscopy of the passivated catalyst failed to detect any copper phases except copper metal, indicating that no significant bulk oxidation had occurred during the passivation. However XPS demonstrated the presence of a surface layer of copper carbonate.

Thermal gravimetric analysis of the passivated catalyst at a heating rate of 10° C. per minute was performed in an atmosphere of air and in an atmosphere of nitrogen. A weight gain was observed when the heating was in air indicating that oxidation was occurring. However this weight gain was only observed at temperatures above 125° C. The total weight gain was only slightly less than the weight gain exhibited by a fully reduced sample of the catalyst, again indicating that bulk oxidation of the catalyst had not occurred during passivation.

Temperature programmed reduction of the passivated catalyst showed that the reduction peak temperature was about 130° C., which is about 80–100° C. below that of the original oxidic precursor.

EXAMPLE 2

In this example the passivation procedure outlined above in relation to the drawing was applied to the passivation of a charge of about 40 $m^3$ of a spent, but still reduced, copper/zinc oxide/alumina methanol synthesis catalyst from the synthesis reactor of a commercial methanol plant. The passivation was effected using a passivation gas comprising about 30% by volume carbon dioxide, 0.1% by volume oxygen, balance nitrogen, at a total pressure of about 7 bar abs. Since the catalyst had been previously used for methanol synthesis from a mixture of hydrogen, carbon monoxide and carbon dioxide, no exotherm was observed upon introducing carbon dioxide into the circulating nitrogen. The oxygen was supplied as air. The circulator inlet temperature was about 15° C. and the circulator exit temperature about 40° C. The flow rate corresponded to a space velocity of about 350–400 $h^{-1}$. The exotherm resulting upon introduction of the air into the nitrogen/carbon dioxide mixture took about 60 minutes to pass from the inlet to the exit of the bed, and after about a further 45 minutes, during which time the oxygen content of the circulating gas was maintained at 0.1% by volume, the temperature of the whole bed fell to the temperature of the inlet gas. The air injection rate was increased until the oxygen content of the circulating gas was about 5% by volume, i.e. an oxygen partial pressure well above the partial pressure of oxygen in air at atmospheric pressure, and then the pressure was released and the catalyst discharged from the reactor.

The discharged catalyst could be safely handled for transportation for disposal or reclaim.

EXAMPLE 3

In this example a catalyst precursor is reduced and then passivated by the passivation procedure outlined above in relation to the drawing.

The precursor employed was a further sample of the precursor employed in Example 1. The precursor was charged to a reactor to form a bed of precursor therein. The reactor was then purged of air with nitrogen. The precursor was then reduced by passing a mixture of nitrogen and hydrogen, containing 2% by volume of hydrogen, over the precursor with an inlet temperature of 200° C. The gas hourly space velocity was 1500 $h^{-1}$ and the total pressure was 3.9 bar g. Reduction was continued until the temperature throughout the bed was constant and no further water was produced.

The nitrogen/hydrogen mixture was replaced by nitrogen and the reactor purged of hydrogen. The reduced catalyst was then cooled to 40° C. Nitrogen was circulated round the loop at 6.0 bar g at such a rate as to give a gas hourly space velocity of 800 $h^{-1}$ through the bed. The bed inlet temperature was 40° C. The loop pressure was dropped to 4.0 bar g and carbon dioxide added to increase the pressure back to 6 bar g. A temperature rise, to a maximum temperature of 53° C. was observed in the bed and this increased temperature rapidly moved through the bed. In less than 1 hour, the temperature of the bed had returned to 40° C. Sufficient air was then injected into the nitrogen/carbon dioxide mixture flowing round the loop to give a concentration of oxygen of 0.2% by volume at the inlet point. An exotherm developed in the bed which moved steadily through the bed. After 9 hours, the temperature of the bed had returned to 40° C. The oxygen concentration was then rapidly built up in the loop by introducing air while purging to allow the carbon dioxide concentration to drop to zero and the pressure to drop to atmospheric. During this addition of air, no further temperature rise occurred in the bed. When all the nitrogen/carbon dioxide had been displaced from the loop, so that the circulating gas was air, i.e. about 21% by volume oxygen, the catalyst was discharged. No warming of the catalyst was observed upon discharge.

EXAMPLE 4

In this example a catalyst precursor is reduced and then passivated by the passivation procedure outlined above in relation to the drawing, but the temperature during passivation exceeds 100° C.

The precursor employed was a further sample of the precursor employed in Example 1. The precursor was charged to a reactor to form a bed of precursor therein. The reactor was then purged of air with nitrogen. The precursor was then reduced by passing a mixture of nitrogen and hydrogen, containing 1% by volume of hydrogen, over the precursor with an inlet temperature of 200° C. The gas hourly space velocity was 1500 $h^{-1}$ and the total pressure was 3.9 bar g. Reduction was continued until the temperature throughout the bed was constant and no further water was produced.

The nitrogen/hydrogen mixture was replaced by nitrogen and the reactor purged of hydrogen. The reduced catalyst was then cooled to 98° C. Nitrogen was circulated round the loop at 5.0 bar g at such a rate as to give a gas hourly space velocity of 1500 $h^{-1}$ through the bed. The bed inlet temperature was 98° C. Carbon dioxide was gradually added to the circulating nitrogen at such a rate that no significant exotherm occurred as the carbon dioxide/nitrogen mixture passed through the bed. Carbon dioxide addition was stopped when the circulating gas contained 20% by volume of carbon dioxide, and then carbon dioxide and nitrogen added as required to maintain the carbon dioxide content at approximately 20% by volume. Air was then injected into the nitrogen/carbon dioxide mixture flowing round the loop to give a concentration of oxygen of 0.2% by volume at the inlet point. An exotherm developed and moved through the bed, giving a maximum temperature of 114° C. Despite the much greater space velocity compared to Example 3, so that oxygen was applied at almost twice the rate, it took 13 hours, i.e. almost 50% longer, for the exotherm to pass through the bed and the temperature to return to 98° C. The oxygen concentration was then increased to 3.5% by volume and the catalyst cooled to ambient temperature. Air was then introduced while purging to allow the carbon dioxide concentration to drop to zero and the pressure to drop to atmospheric. During this addition of air, no further temperature rise occurred in the bed.

EXAMPLE 5

In this example a catalyst precursor is reduced and then passivated by the passivation procedure outlined above in relation to the drawing, but the passivation was effected in the absence of carbon dioxide.

The precursor employed was a further sample of the precursor employed in Example 1. The precursor was charged to a reactor to form a bed of precursor therein. The reactor was then purged of air with nitrogen. The precursor was then reduced by passing a mixture of nitrogen and hydrogen, containing 1% by volume of hydrogen, over the precursor with an inlet temperature of 200° C. The gas hourly space velocity was 1500 $h^{-1}$ and the total pressure was 3.9 bar g. Reduction was continued until the temperature throughout the bed was constant and no further water was produced.

The nitrogen/hydrogen mixture was replaced by nitrogen and the reactor purged of hydrogen. The reduced catalyst was then cooled to 25° C. Nitrogen was circulated round the loop at 5.0 bar g at such a rate as to give a gas hourly space velocity of 1500 $h^{-1}$ through the bed. The bed inlet temperature was 25° C. Air was then injected into the nitrogen flowing round the loop to give a concentration of oxygen of 0.1% by volume at the inlet point. An exotherm developed and moved slowly through the bed over a period of 21 hours. However on passage of the exotherm through the bed, the bed temperature did not return to 25° C., but remained 2–3° C. above this level through out the remainder of the experiment. This is indicative that there is slow bulk oxidation taking place but the cooling effect of the inlet gas limits the overall increase in the bed temperature. After passage of the exotherm through the bed, the oxygen concentration was increased, without any further significant exotherm until the oxygen concentration was that of air. The catalyst was then discharged into a sample container where it was observed that it began to increase in temperature. A lid was then placed upon the sample container before excessively high temperatures were reached. In contrast, as indicated above, no self heating of the catalyst was observed where carbon dioxide had been present during passivation.

I claim:

1. A process for the stabilization of a reduced copper catalyst comprising a) passivating the catalyst by passing a passivating gas stream that is free of reducing gases and which contains 0.05 to 0.5% by volume of oxygen and an amount of carbon dioxide at least twice the amount of oxygen through a bed of the catalyst, the proportion of oxygen in said passivating gas stream and the temperature at which said passivating gas stream is fed to the bed being such that the temperature of the catalyst does not rise to above 100° C. during said passivation step, and then b) increasing the oxygen content of the gas passing through the bed until the oxygen partial pressure corresponds to that of air at atmospheric pressure.

2. A process according to claim 1 wherein the catalyst is a charge of a reduced, used, copper catalyst in a reactor and the catalyst is discharged from the reactor after the oxygen content of the gas passing through the bed has been increased until its oxygen partial pressure corresponds to that of air at atmospheric pressure.

3. A process according to 1 wherein the reduced catalyst has not previously been contacted with carbon dioxide or subjected to a reaction involving or producing carbon dioxide, comprising passing a gas stream containing carbon dioxide but no oxygen through a bed of said catalyst whereby an exotherm corresponding to the reaction of said catalyst with carbon dioxide passes through the bed, and thereafter effecting said passivation by passing the passivating gas stream through said bed.

4. A process according to claim 3 wherein the catalyst is a freshly reduced catalyst and the proportion of oxygen in said passivating gas stream and the temperature at which said passivating gas stream is fed to the bed being such that the temperature of the catalyst does not rise to above 60° C. during said passivation step.

5. A process according to claim 1 wherein the temperature of the passivating gas fed to the catalyst bed is at least 10° C.

6. A process according to any one of claim 1 wherein the proportion of carbon dioxide in the passivating gas stream is at least 5% by volume.

7. A process according to claim 1 wherein the passivation is effected using a passivating gas consisting essentially of a mixture of carbon dioxide and at least one gas selected from oxygen and air.

8. A stabilised passivated reduced copper catalyst having a thin copper carbonate layer on the copper surface and which does not exhibit substantial oxidation when heated in air from 20° C. at a rate of 10° C. per minute until the temperature has reached at least 100° C.

9. A process according to claim 1, wherein the passivation is effected using a passivating gas consisting essentially of a mixture of an inert gas with carbon dioxide and at least one gas selected from oxygen and air.

* * * * *